(12) United States Patent
Suzuki

(10) Patent No.: US 8,508,805 B2
(45) Date of Patent: Aug. 13, 2013

(54) IMAGE PROCESSING APPARATUS, IMAGE FORMING APPARATUS, IMAGE PROCESSING SYSTEM, AND RECORDING MEDIUM, FOR EMBEDDING DIGITAL WATERMARK INFORMATION IN IMAGE DATA AND CONTROLLING OUTPUT OF EMBEDDED DIGITAL WATERMARK

(75) Inventor: Michiyuki Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 359 days.

(21) Appl. No.: 12/878,115

(22) Filed: Sep. 9, 2010

(65) Prior Publication Data
US 2011/0063685 A1      Mar. 17, 2011

(30) Foreign Application Priority Data
Sep. 16, 2009   (JP) .................................. 2009-214034

(51) Int. Cl.
*H04N 1/40*      (2006.01)
*G06K 9/00*      (2006.01)

(52) U.S. Cl.
USPC ........................................ 358/3.28; 382/100

(58) Field of Classification Search
USPC .................................................. 358/3.28, 100
See application file for complete search history.

(56) References Cited

U.S. PATENT DOCUMENTS

| 7,606,426 | B1 * | 10/2009 | Iwamura | ........................ 382/232 |
| 2007/0192876 | A1 | 8/2007 | Takeuchi | |
| 2009/0207434 | A1 * | 8/2009 | Tanaka | ........................ 358/1.14 |

FOREIGN PATENT DOCUMENTS

| JP | 9-200500 | 7/1997 |
| JP | 2000-216982 A | 8/2000 |
| JP | 2001-169093 A | 6/2001 |
| JP | 2004-236224 A | 8/2004 |
| JP | 2007-166342 A | 6/2007 |
| JP | 2007-213162 | 8/2007 |

* cited by examiner

*Primary Examiner* — Twyler Haskins
*Assistant Examiner* — Henok Shiferaw
(74) *Attorney, Agent, or Firm* — Birch, Stewart, Kolasch & Birch, LLP

(57) ABSTRACT

An image processing apparatus capable of embedding digital watermark information in image data and capable of controlling output of the embedded digital watermark information is provided. The image processing apparatus is adapted to include: a unit for generating image data with hidden picture, embedding, in a least significant bit plane of original image data including a plurality of bit planes, at least one piece of hidden picture information and control command including specifying information for specifying a user who wants output of the original image data and user-by-user hidden picture information indicating hidden picture information to be printed on a user-by-user basis, and thereby generating image data with hidden picture; and an output control unit selecting the hidden picture information in accordance with the user based on the specifying information and the user-by-user hidden picture information, and combining and outputting a hidden picture based on the selected hidden picture information and the original image data.

7 Claims, 10 Drawing Sheets

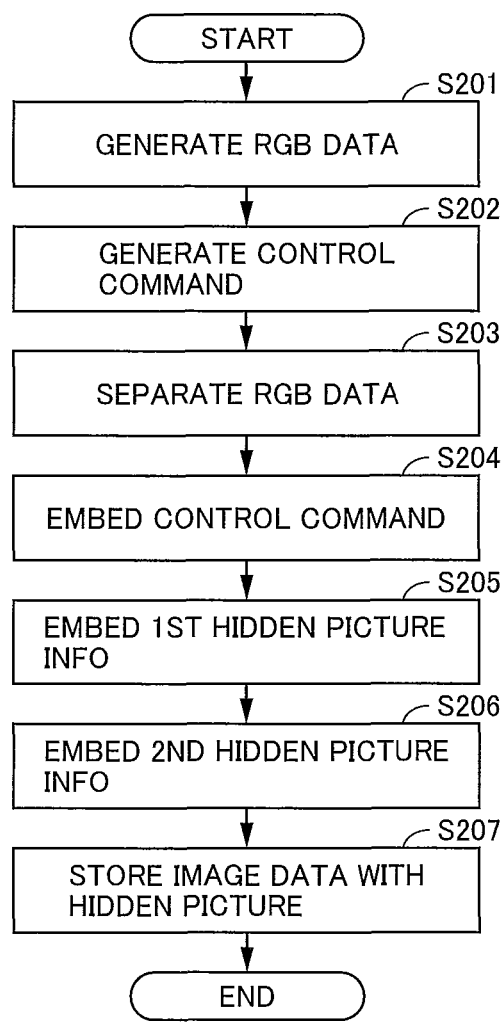

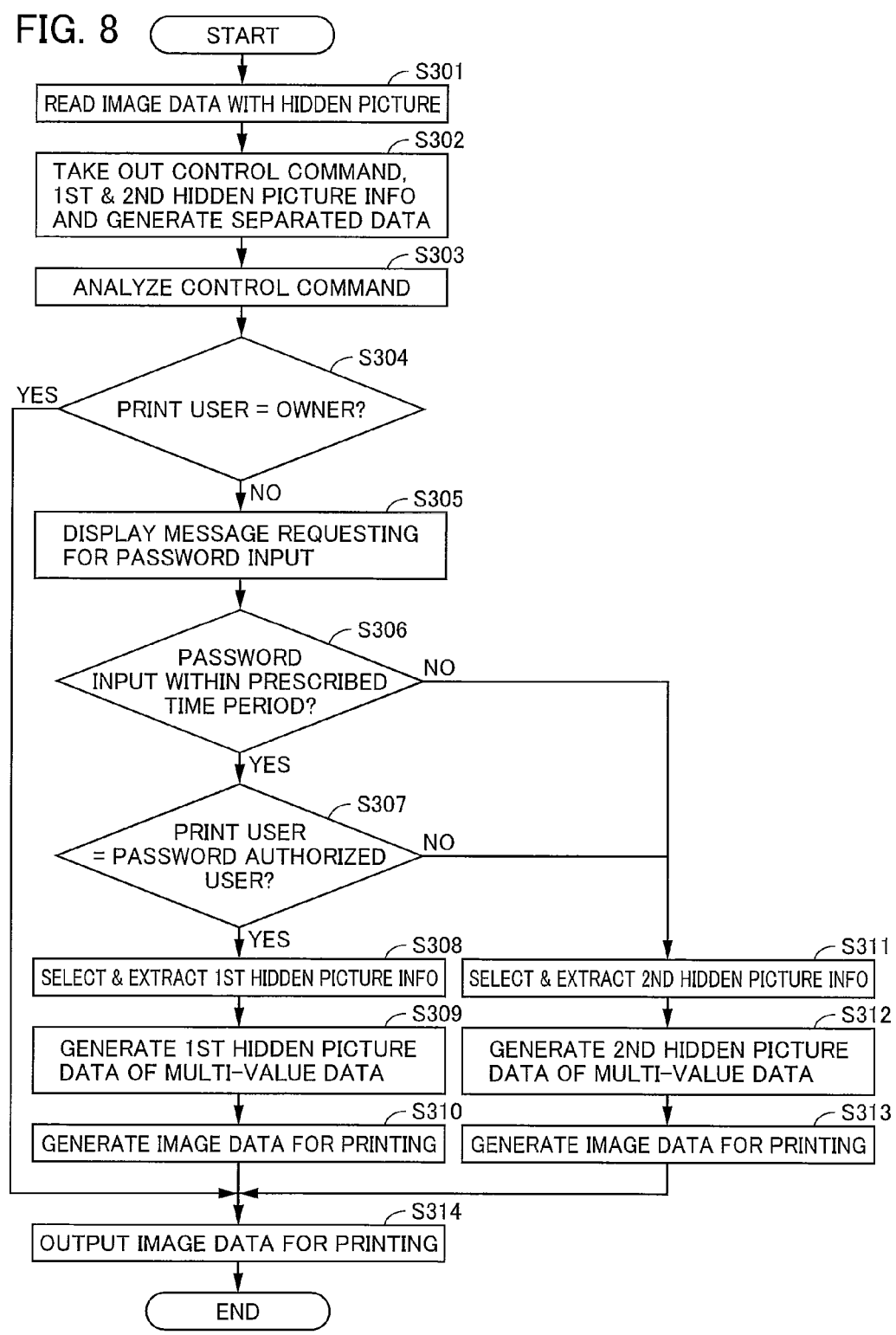

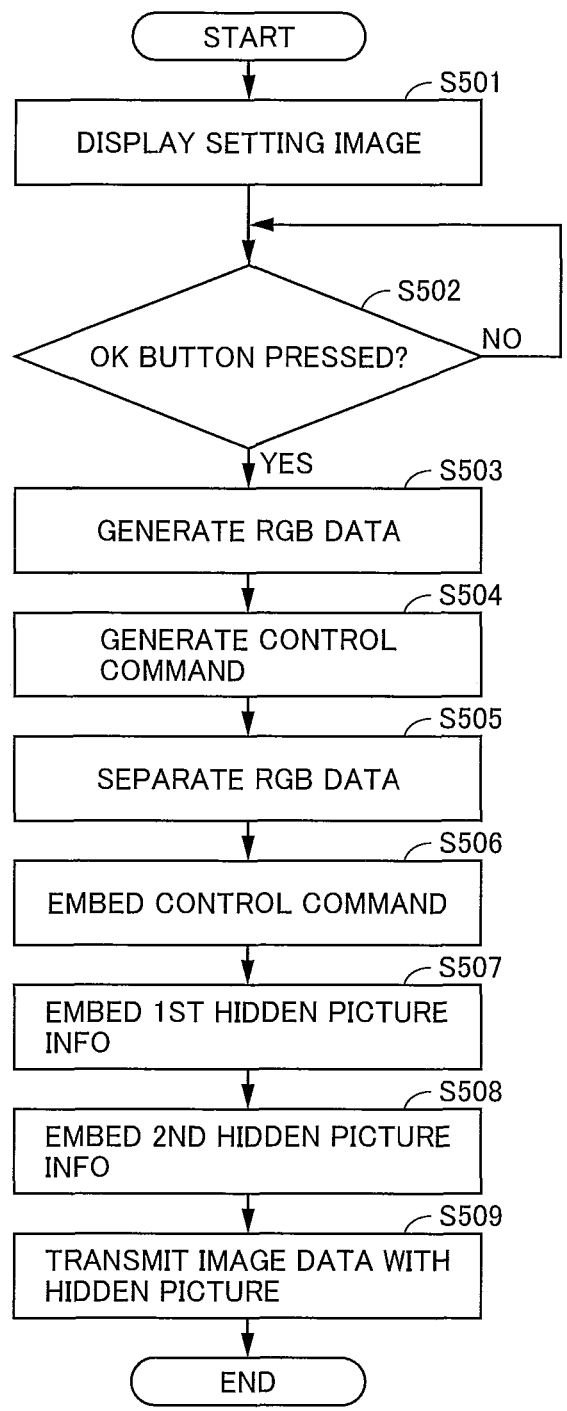

IMAGE PROCESSING APPARATUS, IMAGE FORMING APPARATUS, IMAGE PROCESSING SYSTEM, AND RECORDING MEDIUM, FOR EMBEDDING DIGITAL WATERMARK INFORMATION IN IMAGE DATA AND CONTROLLING OUTPUT OF EMBEDDED DIGITAL WATERMARK

CROSS-REFERENCE TO RELATED APPLICATION

This nonprovisional application claims priority under 35 U.S.C. §119(a) on Patent Application No. 2009-214034 filed in Japan on Sep. 16, 2009, the entire contents of which are hereby incorporated by reference.

BACKGROUND OF THE INVENTION

1. Field of the Invention

The present invention relates to an image processing apparatus, an image forming apparatus, an image processing system, a computer program, and a recording medium recording the computer program and, more specifically, to a technique of controlling output of digital watermark information.

2. Description of the Background Art

Recently, a technique of embedding digital watermark representing a logo or the like of a copyright holder in image data to prevent, for example, unauthorized copying of image data has come to be known.

By way of example, Japanese Patent Laying-Open No. 2000-216982 (hereinafter referred to as "'982 Reference") discloses a technique of performing bit shift processing only in an area to which a visible digital watermark is to be inserted in a luminance plane taken out from original image after color space conversion, whereby the contents of least significant bit are discarded and the area of most significant bit plane is replaced by a binary image of the visible digital watermark.

Japanese Patent Laying-Open No. 2001-169093 (hereinafter referred to as "'093 Reference") discloses a technique of compressing part of bit planes of image data representing an original image, replacing the compressed image data with visible digital watermark information, and embedding the compressed image data in the bit plane of the 0-th bit.

Though '982 Reference and '093 Reference disclose techniques for embedding digital watermark information in the image data, these references are silent about the technique of controlling output of the embedded digital watermark information.

SUMMARY OF THE INVENTION

An object of the present invention is to provide an image processing apparatus, an image forming apparatus, an image processing system, a computer program and a recording medium recording the computer program, enabling embedding of digital watermark information in image data and controlling output of the embedded digital watermark information.

According to an aspect, the present invention provides an image processing apparatus, including: a unit for generating image data with digital watermark, embedding, in a least significant bit plane of original image data including a plurality of bit planes, at least one piece of digital watermark information and control information including specifying information for specifying a user who wants output of the original image data and user-by-user digital watermark information indicating digital watermark information to be output on a user-by-user basis, and thereby generating image data with digital watermark; and an output control unit selecting the digital watermark information in accordance with the user based on the specifying information and the user-by-user digital watermark information, and combing a digital watermark based on the selected digital watermark information with the original image data for outputting.

In this manner, based on the specifying information and the user-by-user digital watermark information embedded in the image data with digital watermark, user-specific digital watermark information is selected, and the digital watermark based on the selected digital watermark information and the original image data are combined and output. Therefore, output of the user-specific digital watermark information can be controlled without increasing data file size. Further, since the information is embedded in the least significant bit plane, influence on the original image data can be minimized.

Preferably, the original image data is RGB data consisting of RGB color components, and the unit for generating image data with digital watermark includes a separating unit for separating the RGB data into a plurality of bit planes of each color component, a control information embedding unit for embedding the control information to the least significant bit plane of any of R data, B data and G data, and a digital watermark embedding unit for embedding the digital watermark information to the least significant bit plane of any of R data, B data and G data not having the control information embedded.

As described above, the original image data is RGB data having three least significant bit planes and, therefore, it is possible to embed the control information and the digital watermark information in bit planes different from each other. Consequently, processes such as selection and extraction of the embedded information become easier, further improving convenience for the user.

More preferably, the said at least one piece of digital watermark information includes a first piece of digital watermark information and a second piece of digital watermark information. The digital watermark embedding unit includes a first embedding unit embedding the first piece of digital watermark information to the least significant bit plane of any of R data, B data and G data not having the control information embedded, and a second embedding unit embedding the second piece of digital watermark information to the least significant bit plane of any of R data, B data and G data having neither the control information nor the first piece of digital watermark information embedded.

In this manner, the control information and the first and second pieces of digital watermark information are embedded in the three least significant bit planes of the RGB data and, therefore, it becomes possible for the output control unit to select the user-specific digital watermark information from the first and second pieces of digital watermark information. Therefore, output of digital watermark information can be controlled for at least two different types of the users.

More preferably, the output control unit includes an output unit outputting the original image data without selecting the digital watermark information if the user is an owner of the original image data. Therefore, the owner of the original image data can obtain the original image data not combined with the digital watermark. Therefore, user convenience can further be improved.

More preferably, the specifying information is an authentication number for determining whether or not the user is an authorized user. The output control unit includes: an information obtaining unit separating a least significant bit plane from the image data with digital watermark, to take out the control information and at least one piece of digital watermark information; a control information analyzing unit analyzing the control information to read the specifying information and the user-by-user digital watermark information; a determining unit determining whether or not the user is an authorized user based on the authentication number; a selecting and extracting unit selecting and extracting the digital watermark information in accordance with the specified user, based on the user-by-user digital watermark information and the result of the determination; and an output combining unit combing a digital watermark based on the extracted digital watermark information with the original image data for outputting.

In this manner, whether or not the user is an authorized user is determined based on the password and the authentication number such as the company member number included in the IC card, and depending on the result of determination, the digital watermark information is selected. Therefore, it becomes possible to control output of the user-specific digital watermark information in easier and more accurate manner.

According to another aspect, the present invention provides an image forming apparatus, including: the image processing apparatus described above; and a reading unit reading image information of a document, and outputting original image data based on the read image information to the image processing apparatus.

Since the image forming apparatus includes the image processing apparatus as described above and the reading unit, it is capable of controlling output of the user specific digital watermark and, in addition, capable of generating the original image data. Therefore, user convenience can further be improved.

According to a still further aspect, the present invention provides an image processing system including an image processing apparatus, and an information processing apparatus performing data communication with the image processing apparatus through a network. The information processing apparatus includes: a unit for generating image data with digital watermark, embedding, in a least significant bit plane of original image data including a plurality of bit planes, at least one piece of digital watermark information and control information including specifying information for specifying a user who wants output of the original image data and user-by-user digital watermark information indicating digital watermark information to be output on a user-by-user basis, and thereby generating image data with digital watermark; and a transmitting unit transmitting the image data with digital watermark to the image processing apparatus. The image processing apparatus includes a receiving unit receiving the image data with digital watermark, and an output control unit selecting the digital watermark information in accordance with the user based on the specifying information and the user-by-user digital watermark information, and combing a digital watermark based on the selected digital watermark information with the original image data for outputting.

In this manner, based on the specifying information and the user-by-user digital watermark information embedded in the image data with digital watermark by the information processing apparatus, the image processing apparatus selects user-specific digital watermark information, and combines and outputs the digital watermark based on the selected digital watermark information with the original image data. Therefore, output of the user-specific digital watermark information can be controlled without increasing data file size. Further, since the information is embedded in the least significant bit plane, influence on the original image data can be minimized.

Preferably, the information processing apparatus includes a data forming unit forming the original image data. Therefore, the information processing apparatus is capable of forming original image data, in addition to generation of the image data with digital watermark. Therefore, user convenience can further be improved.

According to a still further aspect, the present invention provides a computer program causing a computer to function as a unit for generating image data with digital watermark, embedding, in a least significant bit plane of original image data including a plurality of bit planes, at least one piece of digital watermark information and control information including specifying information for specifying a user who wants output of the original image data and user-by-user digital watermark information indicating digital watermark information to be output on a user-by-user basis, and thereby generating image data with digital watermark, and an output control unit selecting the digital watermark information in accordance with the user based on the specifying information and the user-by-user digital watermark information, and combing a digital watermark based on the selected digital watermark information with the original image data for outputting.

By executing the computer program described above, based on the specifying information and the user-by-user digital watermark information embedded in the image data with digital watermark, user-specific digital watermark information is selected, and the digital watermark based on the selected digital watermark information and the original image data are combined and output. Therefore, output of the user-specific digital watermark information can be controlled without increasing data file size. Further, since the information is embedded in the least significant bit plane, influence on the original image data can be minimized.

According to a still further aspect, the present invention provides a computer readable recording medium recording the computer program described above.

The recording medium may be an RAM (Random Access Memory) or an ROM (Read Only Memory) forming a main storage or an auxiliary storage in the computer, a hard disk drive (HDD) as an auxiliary storage or the like. A program reading device may be provided as an external storage of the computer, and the recording medium may be a medium that can be read when inserted to the reading device. Generally, a CPU (Central Processing Unit) reads a computer program from a recording medium other than the main storage, loads the read computer program to the main storage, and executes the same. The CPU performs overall control of various components of the computer to realize a prescribed process in accordance with the installed program.

The recording medium that can be read by the program reading device is a medium for fixedly recording programs, and the examples include: (1) tapes such as magnetic tapes and cassette tapes; (2) disks including a magnetic disk such as a flexible disk (FD) and a hard disk (HD), and an optical disk such as a CD-ROM (Compact Disk Read-Only-Memory), an MO (Magneto Optical Disk), an MD (Mini Disk) and a DVD (Digital Versatile Disk); (3) cards such as an IC (Integrated Circuit) card including a memory card, or an optical card; and (4) a semiconductor memory including a mask ROM, an EPROM (Erasable Programmable Read Only Memory), an EEPROM (Electrically Erasable Programmable Read Only Memory), and a flash memory.

The computer may be configured to be connectable to a communication network including the Internet, and the medium may be one that carries the program in a non-fixed manner, with the computer program downloaded from the communication network. If the computer program is downloaded from the communication network, the program for downloading may be stored in advance in the computer. The program may be installed from other recording media.

In the present invention, based on the specifying information and the user-by-user digital watermark information embedded in the image data with digital watermark, user-specific digital watermark information is selected, and the digital watermark based on the selected digital watermark information and the original image data are combined and output. Therefore, output of the user-specific digital watermark information can be controlled without increasing data file size. Further, since the information is embedded in the least significant bit plane, influence on the original image data can be minimized.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a flowchart representing a control structure of a program for realizing a process for generating the image data with hidden picture, executed by a unit for generating image data with hidden picture.

FIG. 8 is a flowchart representing a control structure of a program for realizing a process for outputting an image with hidden picture, executed by a hidden picture output control unit.

FIG. 11 is a flowchart representing a control structure of a program for realizing the process for generating image data with hidden picture, in accordance with the second modification of an embodiment of the present invention, executed by the control unit of the information processing apparatus.

DESCRIPTION OF THE PREFERRED EMBODIMENTS

Figure 1:
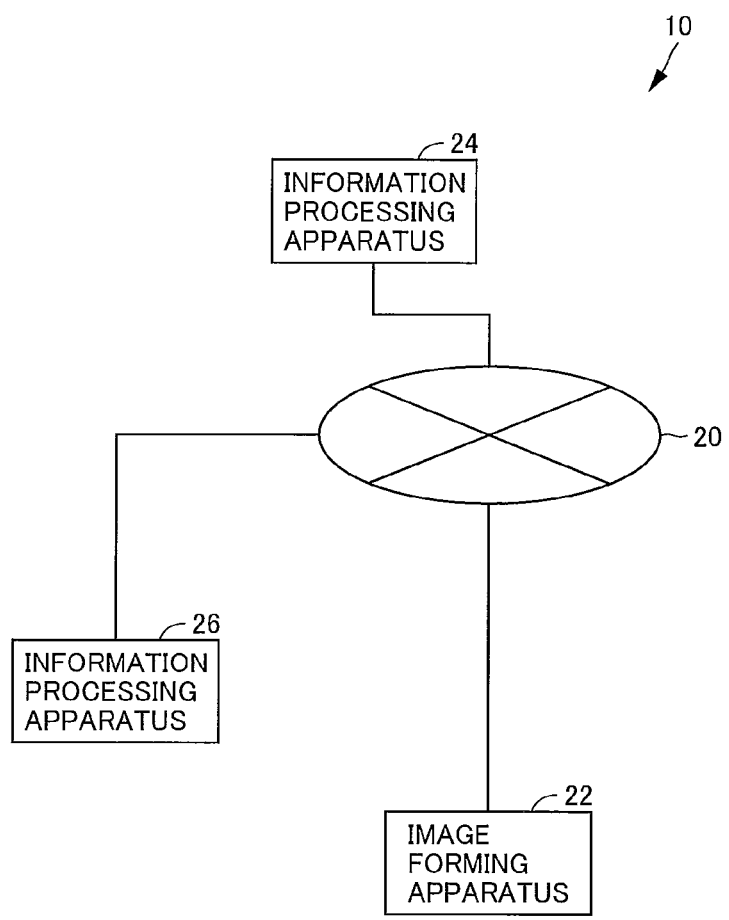
FIG. 1 schematically shows a configuration of an image processing system in accordance with an embodiment of the present invention.

In the following description and drawings, the same components are denoted by the same reference characters. Their functions and names are also the same. Therefore, detailed description thereof will not be repeated.

Referring to FIG. 1, an image processing system 10 includes an image forming apparatus 22, and information processing apparatuses 24 and 26 that perform data communication with image forming apparatus 22 through a network 20.

Information processing apparatus 24 or 26 is a terminal such as a PC (Personal Computer) operated by a user using image forming apparatus 22. Though only information processing apparatuses 24 and 26 are shown in FIG. 1, actually, a larger number of information processing apparatuses may be provided.

In image processing system 10, when a signal instructing execution of a print process and image data as the object of printing are transmitted from information processing apparatus 24 or 26 to image forming apparatus 22, in response to the signal, image forming apparatus 22 executes the printing process.

<Hardware Configuration>
[Image Forming Apparatus 22]

Figure 2:
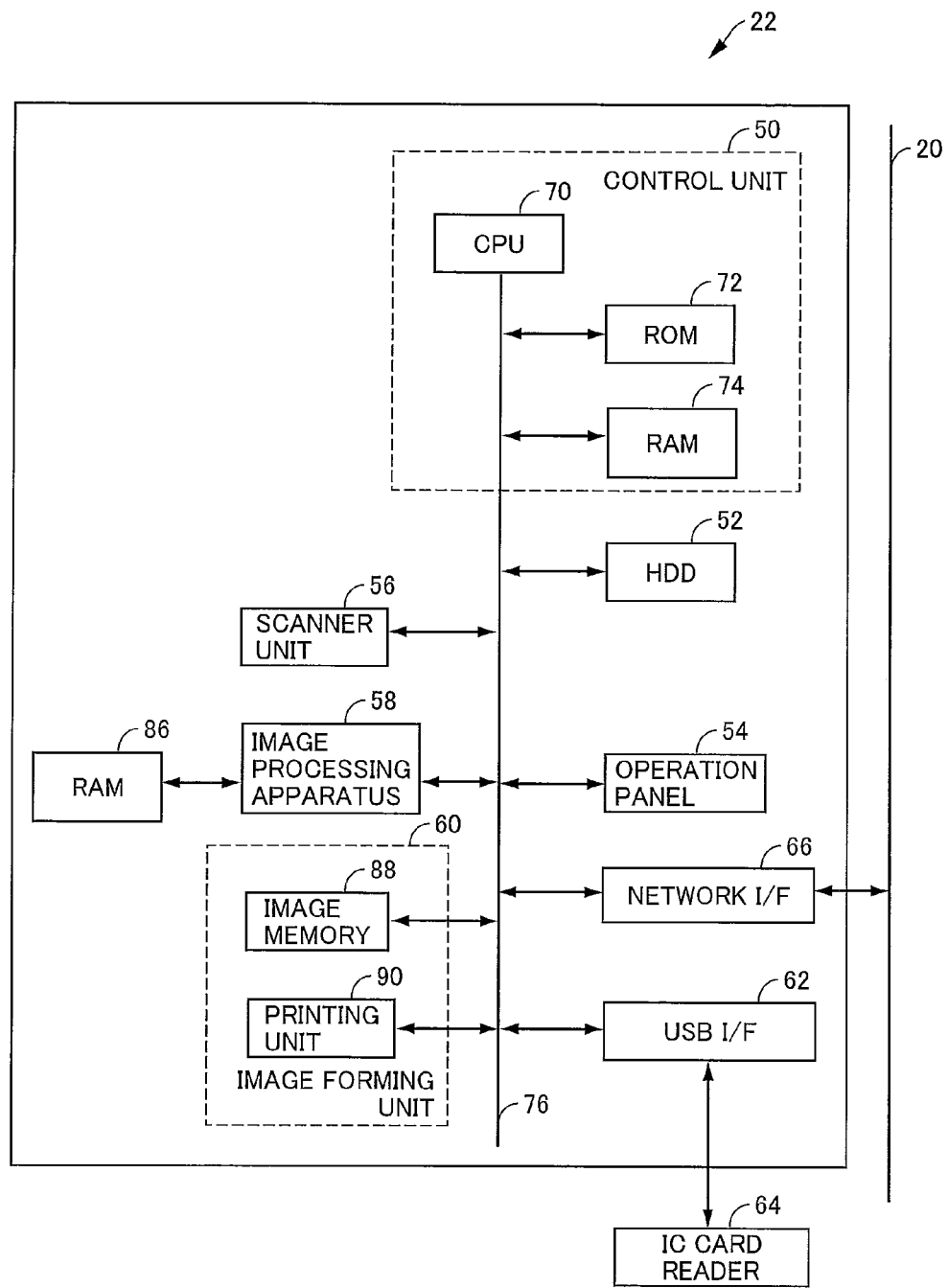
FIG. 2 is a block diagram showing a configuration of the image forming apparatus.

Referring to FIG. 2, image forming apparatus 22 is an MFP (Multifunction Printer) having scanner function, copy function and printer function. Image forming apparatus 22 includes a control unit 50, an HDD 52, an operation panel 54, a scanner unit 56, an image processing apparatus 58, an image forming unit 60, an USB (Universal Serial Bus) interface (USB I/F) 62 and a network interface (network I/F) 66.

Control unit 50 is substantially a computer, including a CPU 70, an ROM 72 and an RAM 74. To CPU 70, a bus line 76 is connected, and to bus line 76, ROM 72 and RAM 74 are electrically connected.

CPU 70 executes various computer programs in accordance with instructions from, for example, operation panel 54, to realize operations of various components of image forming apparatus 22 and to execute desired processes such as data communication with an external apparatus such as information processing apparatus 24 or 26. The various computer programs mentioned above are stored in advance in ROM 72 or HDD 52, and when a desired process is to be executed, the program is read from ROM 72 or HDD 52 and transferred to RAM 74. CPU 70 reads a program instruction from an address in RAM 74, designated by a value stored in a register referred to as a program counter, not shown, in CPU 70, and interprets the same. CPU 70 also reads data necessary for an operation from the address designated by the read instruction, and executes an operation corresponding to the instruction on the data. The results of execution are also stored in an address designated by the instruction, such as RAM 74, HDD 52 and the register in CPU 70.

To bus line 76, HDD 52, operation panel 54, scanner unit 56, image processing apparatus 58, image forming unit 60, USB I/F 62 and network I/F 66 are further electrically connected.

HDD 52 stores: company member number information including all company member numbers of a company holding image forming apparatus 22; a hidden picture database; and various data including image data with hidden pictures as will be described later. Here, the hidden picture refers to digital watermark information such as a company logo or a character string such as "Internal Use Only" or "Confidential." The hidden picture database includes a plurality of hidden picture data and pieces of color information.

HDD 52 stores, in addition to the computer program for realizing general operations of image forming apparatus 22, a computer program for realizing the process for generating image data with hidden picture and the process for outputting image with hidden picture, as will be described later. The process for generating image data with hidden picture and the process for outputting image with hidden picture are executed by an MPU (Micro Processing Unit) of image processing apparatus 58.

Operation panel 54 is formed by superposing an input unit including a touch panel with various input keys on a display unit formed, for example, of a liquid crystal display. Operation panel 54 includes: a save key for saving image data with hidden picture, for instructing start of the process for generating image data with hidden picture as will be described later; a start key for instructing start of a process for reading image information by scanner unit 56; and a print key for instructing start of a print process by image forming unit 60.

When the save key for saving the image data with hidden picture mentioned above is pressed by an owner of a document including the original image (hereinafter referred to as "original document"), an image for setting saving of image data with hidden picture (not shown, hereinafter simply referred to as "setting image") is displayed on the display unit of operation panel 54. The setting image allows the owner to input: an owner name indicating the name of the owner; destination for saving the image data with hidden picture; file name of the saving destination; a first hidden picture and its color; a second hidden picture and its color; and a password. On the setting image, a plurality of hidden pictures and pieces of color information included in the hidden picture database are displayed, and by selecting any of these, it is possible for the owner to input the first hidden picture and its color and the second hidden picture and its color. Here, the first hidden picture refers to a hidden picture output to a print user who is authorized by the password (hereinafter referred to as "password-authorized user"). The second hidden picture refers to a hidden picture output to a print user not passed the password authentication (hereinafter referred to as "guest"). The print user refers to a user who wants to print the original image data based on the original document. The password information input by the owner is transmitted, together with the company member number information of the owner, to image processing apparatus 58. In the following, the information including the password and the company member number of the owner will be referred to as the authentication information.

Scanner unit 56 includes an optical system with a document detecting sensor and a CCD (Charge Coupled Device) line sensor (both not shown). The document detection sensor forms, on the CCD line sensor, an image of a reflected light obtained by irradiating an image-bearing surface of a document placed on a platen (not shown) manually by the user or by an ADF (Automatic Document Feeder, not shown) with light from a light source (not shown). The CCD line sensor successively performs photo-electric conversion of the image formed by reflected light, and generates image data of RGB analog signals corresponding to respective colors of RGB (R: Red, G: Green, B: Blue). The RGB analog signals are transmitted to image processing apparatus 58 with information indicating the first hidden picture and its color (hereinafter referred to as "first piece of hidden picture information") and information indicating the second hidden picture and its color (hereinafter referred to as "second piece of hidden picture information"). In the following, data including the RGB analog signals and the first and second pieces of hidden picture information will be referred to as print data.

Image processing apparatus 58 includes an MPU (not shown). Image processing apparatus 58 performs various image processing operations using RAM 86 as a dedicated memory, on the image data input from scanner unit 56 or from an external apparatus. Image data for printing of a prescribed tone generated by the various image processing operations is output to image forming unit 60. Further, MPU of image processing apparatus 58 executes the process for generating image data with hidden picture and the process for outputting image with hidden picture, to realize various functions as will be described later.

Image forming unit 60 includes an image memory 88 and a printing unit 90. Image memory 88 includes an RAM, and it temporarily stores image data for printing on page by page basis. Image memory 88 successively outputs the stored image data for printing to printing unit 90 in synchronization with image formation by printing unit 90, in accordance with an instruction from control unit 50 or the like.

Printing unit 90 includes: a photoreceptor drum, a charger, a laser scanning unit (LSU), a developer, a transfer unit, a cleaning unit, and a fixing unit (all not shown). Printing unit 90 further includes a manual paper feed tray and first and second paper feed trays (all not shown), detachably attached to image forming apparatus 22. These paper feed trays are arranged from top to bottom in this order. These paper feed trays hold sheets of recording paper, and feed sheets of recording paper to a paper feeding unit (not shown) for feeding the recording paper. The manual feed tray is for allowing the user to manually set a desired sheet of recording paper. The first and second paper feed trays are to hold sheets of recording paper of different sizes. In response to an instruction from control unit 50 or the like, printing unit 90 forms an image based on the image data for printing transmitted from image memory 88, on the sheet of recording paper fed from any of the paper feed trays through the paper feeding unit.

USB I/F 62 is an interface with a USB port. To USB I/F 62, an IC card reader 64 is connected. When an IC card is inserted to a card insertion slot (not shown), IC card reader 64 reads the company member number included in the IC card, and outputs a signal including the read information to control unit 50. The read company member number is used for user authentication, for determining whether or not the user who is going to use image forming apparatus 22 is a member of the company holding the image forming apparatus 22.

Image forming apparatus 22 is connected to network 20 through network I/F 66, and capable of data communication with information processing apparatuses 24 and 26.

A power source (not shown) is connected to each of the components of image forming apparatus 22, and each component of image forming apparatus 22 operates with electric power supplied from the power source.

[Image Processing Apparatus 58]

Various portions of image processing apparatus 58 described below are actually realized by a computer program executed by MPU of image processing apparatus 58.

Figure 3:
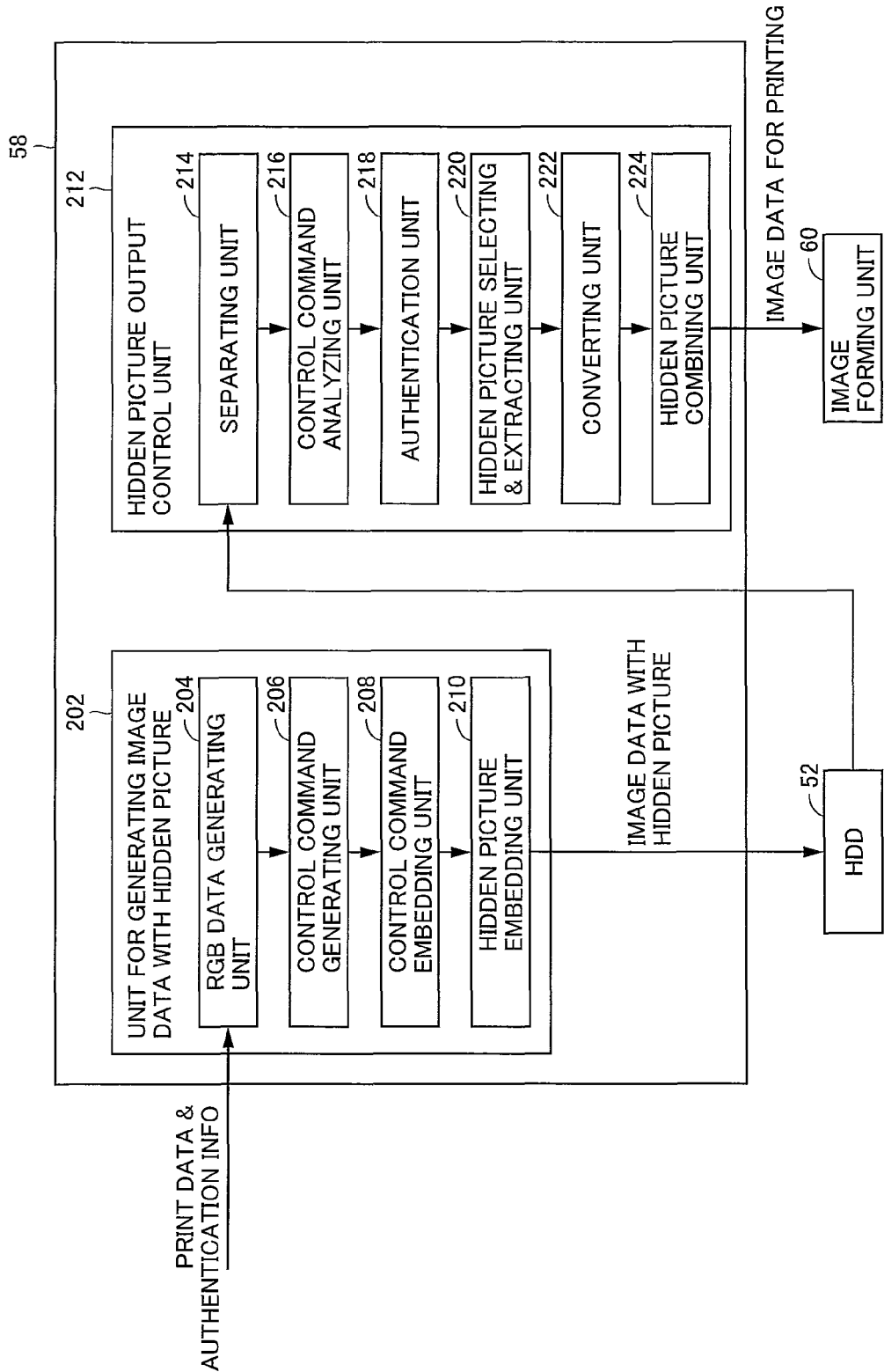
FIG. 3 is a functional block diagram of an image processing apparatus in accordance with an embodiment of the present invention.

Referring to FIG. 3, image processing apparatus 58 includes a unit 202 for generating image data with hidden picture. Unit 202 for generating image data with hidden picture includes: an RGB data generating unit 204; a control command generating unit 206; a control command embedding unit 208; and a hidden picture embedding unit 210.

RGB data generating unit 204 performs various image processing operations including an analog/digital converting process, on the RGB analog signals included in the print data, and thereby generates RGB digital signals (hereinafter referred to as "RGB data").

Control command generating unit 206 generates a control command based on the first and second pieces of hidden picture information and the authentication information included in the print data. The control command includes: owner information indicating the company member number of the owner; password information; user-by-user hidden picture information representing the hidden picture to be output for each print user; and an end code.

In the present embodiment, a control command of about 20 bytes, as shown below, is generated. In the control command, as the owner information, the company member number of the owner is written to an area of 4 bytes. The owner information is not limited to the company member number of the owner mentioned above, and it may be any information that can identify the owner. As the password information, the password input by the owner is written to an area of 4 bytes. As the user-by-user hidden picture information, hidden picture information for password authorized user is written to an area of 4 bytes, and hidden picture information for a guest is written to an area of 4 bytes. As the end code, a character string such as FFFFFFFF is written to an area of 4 bytes. When such a character string is used as the end code, it should be noted that similar character string should not occur preceding to the end code.

In the hidden picture information for password authorized user mentioned above, "1" representing the first hidden picture stored in any of the RGB color components (in the present embodiment, G component) is written to an area of 1 byte, and color information (RGB information) of the first hidden picture designated by the owner is written to an area of 3 bytes. In the hidden picture information for a guest, "2" representing the second hidden picture stored in any of the RGB color components (in the present embodiment, B component) is written to an area of 1 byte, and color information (RGB information) of the second hidden picture designated by the owner is written to an area of 3 bytes.

Control command embedding unit 208 embeds the control command in the RGB data. Hidden picture embedding unit 210 embeds the first and second pieces of hidden picture information in the RGB data. Thus, the image data with hidden picture is generated.

Figure 4:
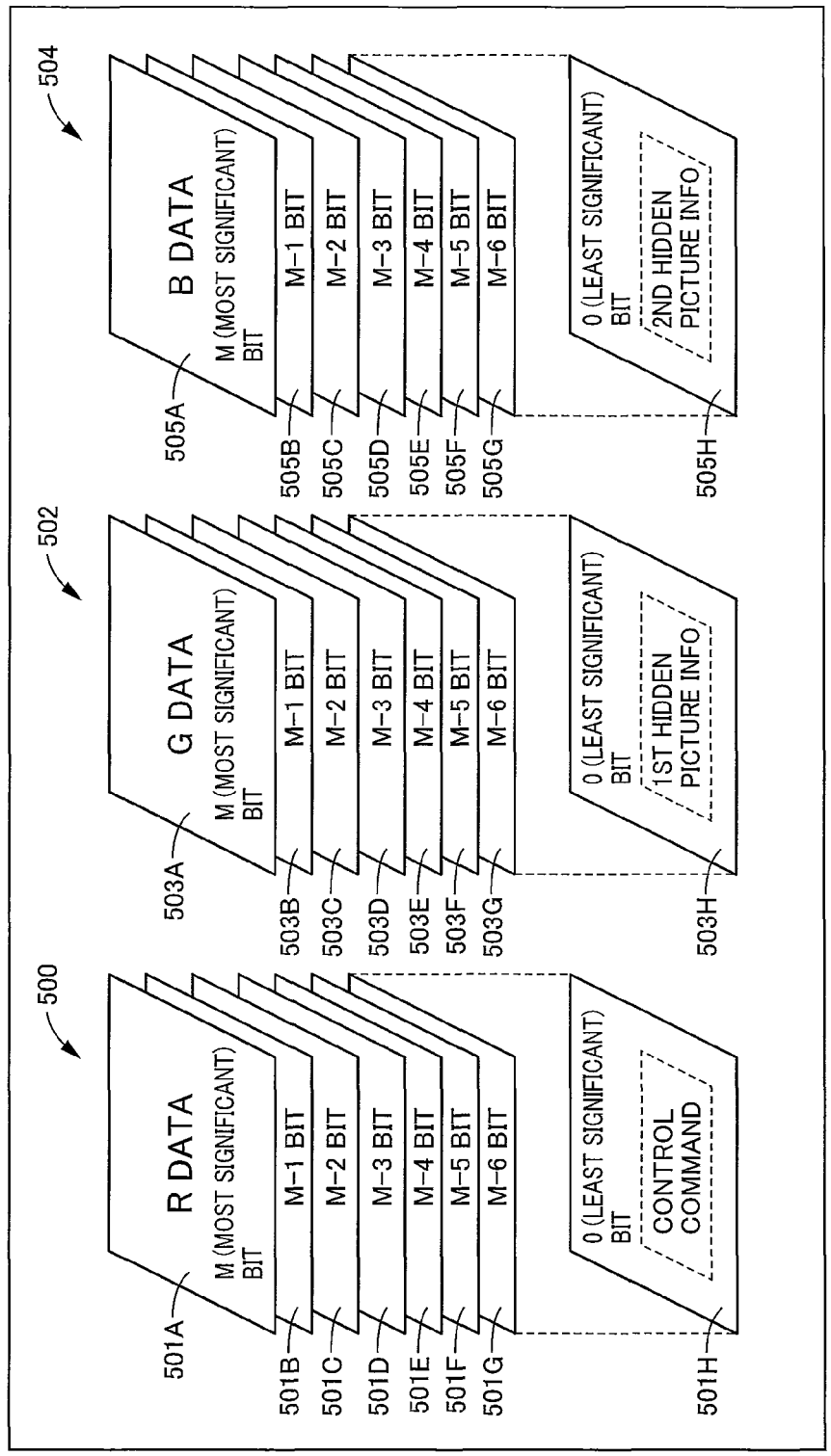
FIG. 4 illustrates a structure of image data with hidden picture.

Referring to FIG. 4, for embedding the control command and the first and second pieces of hidden picture information to the RGB data, unit 202 for generating image data with hidden picture first separates the RGB data into a plurality of bit planes of each color component. As a result, R data 500 is separated into M bit planes 501A to 501H. G data 502 is separated into M bit planes 503A to 503H. B data 504 is separated into M bit planes 505A to 505H. Bit plane numbers 0 to M are successively allocated to the bit planes mentioned above, from the least significant bit plane to the most significant pit plane. Specifically, the M-th bit planes 501A, 503A and 505A are the most significant bit planes, while the 0-th bit planes 501H, 503H and 505H are least significant bit planes.

Control command embedding unit 208 replaces the data of the 0-th bit plane (in the example of FIG. 4, bit plane 501H) of any of the R data 500, G data 502 and B data 504 (in the example of FIG. 4, R data 500) with the control command, thereby to embed the control command in the RGB data.

Hidden picture embedding unit 210 replaces data of the 0-th bit plane (in the example of FIG. 4, bit plane 503H) of any of the remaining R data 500, G data 502 and B data 504, (in the example of FIG. 4, G data 502) not having the control command embedded, with the first piece of hidden picture information, thereby to embed the first piece of hidden picture information in the RGB data.

Hidden picture embedding unit 210 further replaces data of the 0-th bit plane (in the example of FIG. 4, bit plane 505H) of any of the remaining R data 500, G data 502 and B data 504, (in the example of FIG. 4, B data 504) not having the control command or first piece of hidden picture information embed-ded, with the second piece of hidden picture information, thereby to embed the second piece of hidden picture information in the RGB data.

The RGB data with the control command and the first and second pieces of hidden picture information embedded in the above-described manner is stored as the image data with hidden picture, in HDD 52.

Referring to FIG. 3, image processing apparatus 58 further includes a hidden picture output control unit 212. Hidden picture output control unit 212 includes: a separating unit 214; a control command analyzing unit 216; an authentication unit 218; a hidden picture selecting and extracting unit 220; a converting unit 222; and a hidden picture combining unit 224.

Separating unit 214 separates, from the image data with hidden picture, the bit plane of the 0-th bit of each color component, to take out the control command and the first and second pieces of hidden picture information. At this time, separating unit 214 sets the value of each pixel in each bit plane of the 0-th bit to "0", to generate the RGB data as separated (hereinafter referred to as "separated data"). Since only the least significant bit plane is changed, influence on the image quality of the print image can be made small.

Control command analyzing unit 216 analyzes the control command, and reads the company member number of the owner, the password, and the user-by-user hidden picture information.

Authentication unit 218 determines whether or not the print user is the owner, based on whether or not the company member number of print user read from the IC card is the same as the company member number of the owner included in the control command. Authentication unit 218 further determines whether or not the print user is the password authorized user, based on whether or not the password input through operation panel 54 by the print user is the same as the password included in the control command.

Hidden picture selecting and extracting unit 220 selects and extracts, if the print user is the password authorized user, the first piece of hidden picture information, based on the hidden picture information for the password authorized user. If the print user is a guest, it selects and extracts the second piece of hidden picture information, based on the hidden picture information for the guest. If the print user is the owner, the hidden picture is not selected.

Converting unit 222 generates the first or second hidden picture data consisting of multi-value data, based on the extracted first or second piece of hidden picture information. Generation of the first or second hidden picture data of multi-value data by converting unit 222 is performed in the following manner. The hidden picture data included in the first or second piece of hidden picture information is binary data including pixel values each set to "0" or "1". If the pixel value is "0", converting unit 222 converts the binary data to white data (RGB=F, F, F), and if the pixel value is "1", it converts the binary data to RGB data in accordance with the color information included in the first or second piece of hidden picture information.

Hidden picture combining unit 224 combines the first or second hidden picture data consisting of multi-value data with the separated data, to generate the image data for printing. Generation of the image data for printing by hidden picture combining unit 224 is performed in the following manner. Assume, for example, that the separated data of white data (RGB=FF, FF, FF) is to be combined with the first or second hidden picture data of red data (RGB=FF, 00, 00). Here, from the white data (RGB=FF, FF, FF), an image density inverted data of red data (RGB=00, FF, FF) is subtracted.

As a result, image data for printing in which only the first or second hidden picture image in red emerges in the printed image is generated. In this manner, by subtracting the inverted data obtained by inverting the image density of the first or second hidden picture data of multi-value data from the separated data, the image data can be combined with high efficiency. Here, it is assumed that after the subtracting process, data of a negative value is set to "0". Therefore, if the separated data is black (RGB=00, 00, 00), the print image remains black.

The image data for printing generated in the above-described manner is output to image forming unit 60.

[Information Processing Apparatus 24, 26]

Figure 5:
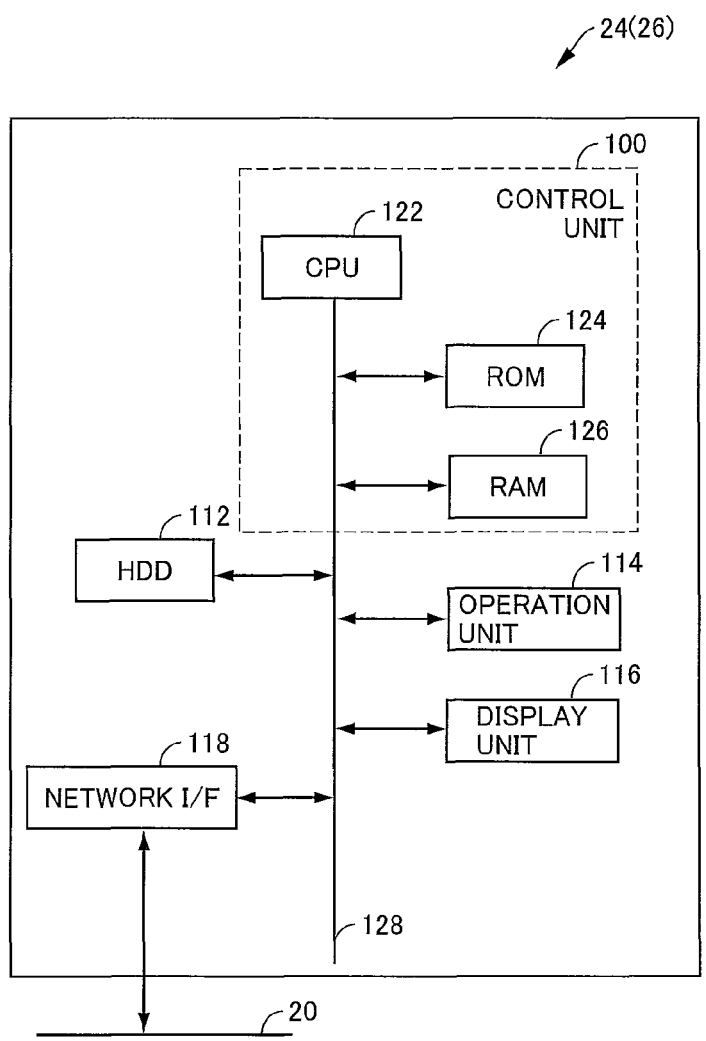
FIG. 5 is a block diagram showing a configuration of an information processing apparatus.

Referring to FIG. 5, each of information processing apparatuses 24 and 26 includes a control unit 100, an HDD 112, an operation unit 114, a display unit 116, and a network I/F 118.

Control unit 100 is substantially a computer, and it includes a CPU 122, an ROM 124, and an RAM 126. A bus line 128 is connected to CPU 122, and to bus line 128, ROM 124 and RAM 126 are electrically connected. CPU 122 executes various computer programs in accordance with instructions from, for example, an external apparatus such as image forming apparatus 22 or operation unit 114, to realize operations of various components of information processing apparatus 24, 26 and to execute desired processes such as data communication with an external apparatus such as image forming apparatus 22. The various computer programs mentioned above are stored in advance in ROM 124 or HDD 112, and when a desired process is to be executed, the program is read from ROM 124 or HDD 112 and transferred to RAM 126. CPU 122 reads a program instruction from an address in RAM 126, designated by a value stored in a register referred to as a program counter, not shown, in CPU 122, and interprets the same. CPU 122 also reads data necessary for an operation from the address designated by the read instruction, and executes an operation corresponding to the instruction on the data. The results of execution are also stored in an address, designated by the instruction, of RAM 126, HDD 112 and the register in CPU 122.

HDD 112 stores various data including the company member number information and image data, as well as a printer driver. Control unit 100 executes the printer driver, and thereby realizes the process for converting application data to image data for printing (PDL (Page Description Language) data and compressed bit map data) and the operation of transmitting the image data designated by the user to image forming apparatus 22 to have the data printed, and realizes user authentication as will be described later.

To bus line 128, HDD 112, operation unit 114, display unit 116, and network I/F 118 are further electrically connected.

Operation unit 114 is implemented by a keyboard for various inputs including character input, and a mouse as a pointing device. Display unit 116 is a display device such as a liquid crystal display, for displaying, for example, results of processing by information processing apparatus 24, 26. Operation unit 114 and display unit 116 are connected to bus line 128 through an interface (not shown). A user of information processing apparatus 24, 26 can form various image data by an input operation through operation unit 114.

When information processing apparatus 24, 26 is powered on by the user of information processing apparatus 24, 26, a message requesting for an input of the company member number is displayed on display unit 116. When the user confirming the message inputs the company member number by an input operation on operation unit 114, control unit 100 determines whether or not the input company member number is included in the company member number information stored in HDD 112, for user authentication. If it is determined by the user authentication that the user is a member of the company, use of information processing apparatus 24, 26 is permitted.

Information processing apparatus 24, 26 is connected to network 20 through network I/F 118, and it is capable of data communication with image forming apparatus 22.

A power source (not shown) is connected to each of the components of information processing apparatus 24, 26, and each component of information processing apparatus 24, 26 operates with electric power supplied from the power source.

[Software Configuration]

In the following, control structures of various computer programs stored in HDD 52 will be described.

(Process for Generating Image Data with Hidden Picture by Control Unit 50)

As described above, the computer program stored in HDD 52 is programmed to execute the process for generating the image data with hidden picture. The program for realizing the process for generating the image data with hidden picture is activated when the save key for saving image data with hidden picture on operation panel 54 is pressed by the owner.

Figure 6:
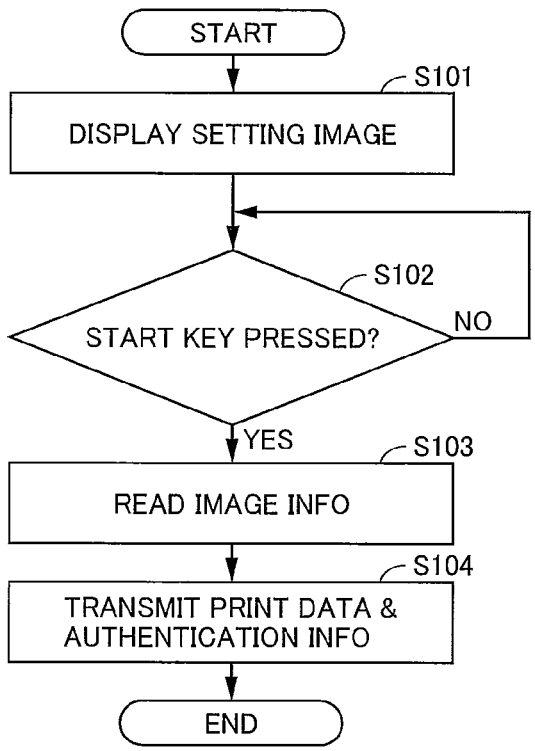
FIG. 6 is a flowchart representing a control structure of a program for realizing a process for generating the image data with hidden picture, executed by a control unit of the image forming apparatus.

Referring to FIG. 6, the program includes: a step S101 of displaying the setting image on operation panel 54; a step S102 of waiting until a start key on operation panel 54 is pressed; a step S103, executed if it is determined at step S102 that the start key is pressed (YES), of causing scanner unit 56 to read the image information from the original document placed on a platen; and a step S104 of transmitting the print data and authentication information to image processing apparatus 58.

(Process for Generating Image Data with Hidden Picture in Image Processing Apparatus 58)

The program for realizing the process for generating image data with hidden picture is activated when image processing apparatus 58 receives the print data and the authentication information. Referring to FIG. 7, the program includes: a step S201 of causing RGB data generating unit 204 to perform various image processing operations including the analog/digital converting process on the RGB analog signals included in the print data, and thereby generating RGB data; and a step S202, of causing control command generating unit 206 to generate the control command based on the first and second pieces of hidden picture information included in the print data and the authentication information.

The program further includes: a step S203 of separating the RGB data into a plurality of bit planes of each color component; a step S204 of causing control command embedding unit 208 to replace the data of the 0-th bit plane of any of R data, G data and B data with the control command, and thereby embedding the control command in the RGB data; a step S205 of causing hidden picture embedding unit 210 to replace the data of the 0-th bit plane of either of the remaining R data, G data and B data with the first piece of hidden picture information, and thereby embedding the first piece of hidden picture information in the RGB data; and a step S206 of causing hidden picture embedding unit 210 to replace the data of the 0-th bit plane of the remaining one of the R data, G data and B data with the second piece of hidden picture information, and thereby embedding the second piece of hidden picture information in the RGB data.

The program further includes a step S207 of storing the RGB data with the control command and the first and second pieces of hidden picture information embedded, as the image data with hidden picture, in HDD 52.

(Process for Outputting Image with Hidden Picture by Image Processing Apparatus 58)

The program for realizing the process for outputting an image with hidden picture is activated when the image data with hidden picture stored in HDD 52 is selected and the print key is pressed, by the print user.

Referring to FIG. 8, the program includes: a step S301 of reading the selected image data with hidden picture from HDD 52; and a step S302 of causing separating unit 214 to separate the 0-th bit planes of each color component from the read image data with hidden picture, to take out the control command and the first and second pieces of hidden picture information, and to set each pixel value of each 0-th bit plane to "0", for generating the separated data.

The program further includes: a step S303 of causing control command analyzing unit 216 to analyze the control command, and to read the company member number of the owner, the password, and the user-by-user hidden picture information; a step S304 of causing authentication unit 218 to determine whether the print user is the owner, based on whether or not the company member number of the print user read from the IC card matches the company member number of the owner included in the control command; and a step S305, executed if it is determined at step S304 that the print user is not the owner (NO), of causing operation panel 54 to display a message requesting for an input of a password.

The program further includes: a step S306 of determining whether or not a password is input within a certain predetermined time period; and a step S307, executed if it is determined at step S306 that the password is input (YES), of causing authentication unit 218 to determine whether the print user is a password authorized user or not, based on whether or not the input password is the same as the password included in the control command.

The program further includes: a step S308, executed if it is determined at step S307 that the print user is the password authorized user (YES), of causing hidden picture selecting and extracting unit 220 to select and extract the first piece of hidden picture information based on the hidden picture information for the password authorized user included in the user-by-user hidden picture information; a step S309 of causing converting unit 222 to generate the first hidden picture data of multi-value data, based on the extracted first piece of hidden picture information; and a step S310 of causing hidden picture combining unit 224 to combine the first hidden picture data of multi-value data with the separated data, and thereby generating the image data for printing.

The program further includes: a step S311, executed if it is determined at step S306 that the password has not been input (NO), or if it is determined at step S307 that the print user is not the password authorized user, of causing hidden picture selecting and extracting unit 220 to select and extract the second piece of hidden picture information based on the hidden picture information for a guest, included in the user-by-user hidden picture information; a step S312 of causing converting unit 222 to generate the second hidden picture data of multi-value data based on the extracted second piece of hidden picture information; and a step S313 of causing hidden picture combining unit 224 to combine the second hidden picture data of multi-value data with the separated data, to generate the image data for printing.

The program further includes: a step S314, executed if it is determined at step S304 that the print user is the owner (YES) or after the process of step S310 or step S313, of outputting the image data for printing to image forming unit 60. If the print user is the owner at step S314, the separated data is output as the image data for printing.

<Operation>

Referring to FIGS. 1 to 8, image forming apparatus 22 of image processing system 10 operates in the following manner. General operations of image forming apparatus 22 except for the operation described below are the same as those of the conventional image forming apparatus.

(Operation when Image Data with Hidden Picture is Formed)

The owner turns on the power of image forming apparatus 22, and inserts an IC card to a card insertion slot (not shown) of IC card reader 64. IC card reader 64 reads the company member number of the owner from the IC card, and outputs a read signal including the read information to control unit 50. Control unit 50 determines whether or not the company member number included in the read signal is included among the company member number information stored in HDD 52, to perform user authentication.

In the user authentication, if the owner is determined to be a company member and use of image forming apparatus 22 is permitted, the owner places an original document on a platen (not shown) of scanner unit 56, and presses the save key for saving image data with hidden picture on operation panel 54.

When the save key for saving image data with hidden picture is pressed, the setting image is displayed on operation panel 54 (step S101).

The owner confirms the setting image, and inputs the owner name, saving destination of the image data with hidden picture, file name, first hidden picture and its color, second hidden picture and its color, and the password by input operations through operation panel 54. In the present embodiment, the owner selects and inputs a character string of "Internal User Only" to be output in small letters on an upper right corner of the printed image as the first hidden picture, and selects and inputs red as its color. The owner further selects and inputs a character string of "Confidential" to be output in large letters diagonally at the center of the printed image as the second hidden picture, and selects and inputs red as its color.

After the input of each of these pieces of setting information mentioned above, the owner presses the start key of operation panel 54. When the start key is pressed (YES at step S102), scanner unit 56 reads image information from the original document placed on the platen (step S103). The RGB analog signals based on the image information read by scanner unit 56 and the print data including the first and second pieces of hidden picture information based on the information input by the owner are transmitted, together with the authentication information including the company member number of the owner and the password, to image processing apparatus 58 (step S104).

When image processing apparatus 58 receives the print data and the authentication information, RGB data generating unit 204 performs various image processing operations including analog/digital converting process on RGB analog signals included in the print data, to generate RGB data (step S201). Control command generating unit 206 generates the control command based on the first and second pieces of hidden picture information included in the print data and on the authentication information (step S202).

Thereafter, unit 202 for generating image data with hidden picture separates the RGB data into a plurality of bit planes of each color component (step S203). After separation, control command embedding unit 208 replaces the data of the 0-th bit plane (in the present example, bit plane 50111) of any of the R data 500, G data 502 and B data 504 (see FIG. 4) (in the present example, R data 500) with the control command, and thereby embeds the control command in the RGB data (step S204).

Hidden picture embedding unit 210 replaces data of the 0-th bit plane (in the present example, bit plane 50311) of either of the remaining G data 502 and B data 504 (in the present example, G data 502) with the first piece of hidden picture information, and thereby embeds the first piece of hidden picture information in the RGB data (step S205). Hidden picture embedding unit 210 further replaces data of the 0-th bit plane (in the present example, bit plane 505H) of the remaining B data 504 with the second piece of hidden picture information, and thereby embeds the second piece of hidden picture information in the RGB data (step S206).

Unit 202 for generating image data with hidden picture stores the RGB data with the control command and the first and second pieces of hidden picture information embedded therein as the image data with hidden picture, in HDD 52 (step S207).

(Operation when Image with Hidden Picture is Output)

The print user turns on the power of image forming apparatus 22, and inserts an IC card to a card insertion slot (not shown) of IC card reader 64. IC card reader 64 reads the company member number of the print user from the IC card, and outputs a read signal including the read information to control unit 50.

Control unit 50 determines whether or not the company member number included in the read signal is included among the company member number information stored in HDD 52, to perform user authentication.

In the user authentication, if the print user is determined to be a company member and use of image forming apparatus 22 is permitted, the print user selects the image data with hidden picture saved in HDD 52 by an input operation through operation panel 54, and presses the print key.

When the print key is pressed, hidden picture output control unit 212 reads the selected image data with hidden picture from HDD 52 (step S301). Separating unit 214 separates the 0-th bit plane of each color component from the read image data with hidden picture to take out the control command and the first and second pieces of hidden picture information, and sets each pixel value of each of the 0-th bit planes to "0", to generate the separated data (step S302).

Control command analyzing unit 216 analyzes the control command, and reads the company member number of the owner, the password, and the user-by-user hidden picture information (step S303).

Authentication unit 218 determines whether or not the print user is the owner, depending on whether or not the company member number of the print user read from the IC card matches the company member number of the owner included in the control command (step S304). If the company member number matches and the print user is determined to be the owner (YES at S304), the separated data is output as the image data for printing, to image forming unit 60 (step S314).

If the company member number does not match and the print user is determined not to be the owner (NO at step S304), a message requesting for a password input is displayed on operation panel 54 (step S305).

If a password is input within a prescribed time period by the print user confirming the message (YES at S306), authentication unit 218 determines whether or not the print user is a password authorized user, based on whether the input password matches the password included in the control command (step S307).

If the password matches and the print user is determined to be the password authorized user (YES at S307), hidden picture selecting and extracting unit 220 selects and extracts the first piece of hidden picture information based on the hidden picture information for the password authorized user included in the user-by-user hidden picture information (step S308). Converting unit 222 generates the first hidden picture data of multi-value data based on the extracted first piece of hidden picture information (step S309). Hidden picture combining unit 224 combines the first hidden picture data of multi-value data with the separated data, to generate the image data for printing (step S310). The generated image data for printing is output to image forming unit 60 (step S314).

If a password is not input within the prescribed time period (NO at step S306) or the password does not match, and the user is determined not to be a password authorized user (NO at step S307), hidden picture selecting and extracting unit 220 selects and extracts the second piece of hidden picture information based on the hidden picture information for a guest included in the user-by-user hidden picture information (step S311). Converting unit 222 generates the second hidden picture data of multi-value data, based on the extracted second piece of hidden picture information (step S312). Hidden picture combining unit 224 combines the second hidden picture data of multi-value data with the separated data, to generate the image data for printing (step S313). The generated image data for printing is output to image forming unit 60 (step S314).

Image forming unit 60 forms an image based on the input image data for printing, on a sheet of recording paper.

—First Modification—

In image processing system 10 described above, by the process for generating image data with hidden picture executed by control unit 50 of image forming apparatus 22, generation of print data and transmission of print data and authentication information are performed. The present invention, however, is not limited to such an embodiment. The first modification of image processing system 10 is different form image processing system 10 described above in that the processes mentioned above can be performed by control unit 100 of information processing apparatus 24. The first modification of image processing system 10 has the same configuration as the image processing system 10 of the above-described embodiment, except for the points below.

<Hardware Configuration>

[Information Processing Apparatus 24]

HDD 112 stores a hidden picture database in addition to various data including the image data and company member number information. Further, a printer driver stored in HDD 112 is capable of realizing, when executed by control unit 100, the process for generating image data with hidden picture in accordance with the present modification as will be described later in addition to the process for converting application data to image data for printing, the process for transmitting image data designated by a user to image forming apparatus 22 to have the data printed, user authentication and the like.

In the present modification, the owner who formed original image data by an input operation through operation unit 114 may have a save button for saving the image data with hidden picture displayed on display unit 116, by an input operation from operation unit 114. By clicking the save button for saving the image data with hidden picture using the mouse of operation unit 114, the owner can instruct to start the process for generating image data with hidden picture in accordance with the present modification.

When the save button for saving the image data with hidden picture mentioned above is pressed by the owner, the setting image is displayed on display unit 116. The setting image is the same as the setting image of the embodiment above, except that it includes an OK button. The formed original image data is transmitted, together with the first and second pieces of hidden picture information based on the information input by the owner, to image processing apparatus 58 of image forming apparatus 22 through network 20. In the following, the data including the original image data and the first and second pieces of hidden picture information will be referred to as the print data.

<Software Configuration>

(Process for Generating Image Data with Hidden Picture by Control Unit 100)

As described above, part of the printer driver stored in HDD 112 is programmed to execute the process for generating the image data with hidden picture in accordance with the present modification. The program for realizing the process for generating image data with hidden picture is activated when the original image data is formed by the owner and the save button for saving the image data with hidden picture is clicked.

Figure 9:
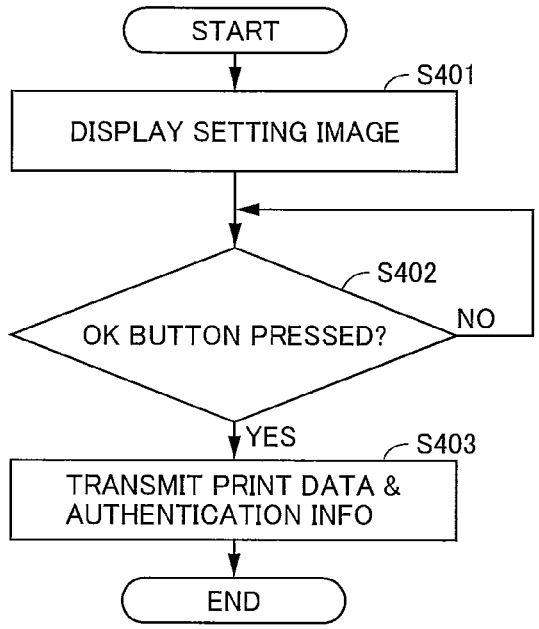
FIG. 9 is a flowchart representing a control structure of a program for realizing a process for generating image data with hidden picture in accordance with a first modification of an embodiment of the present invention, executed by a control unit of the information processing apparatus.

Referring to FIG. 9, the program includes: a step S401 of causing display unit 116 to display the setting image; a step S402 of waiting until the OK button is clicked; and a step S403, executed if it is determined at step S402 that the OK button is clicked (YES), of transmitting the print data and the authentication information to image processing apparatus 58 of image forming apparatus 22 through network 20.

<Operation>

The first modification of image processing system 10 operates in the following manner. The operations of the first modification of image processing system 10 except for the operation described below are the same as those of image processing system 10 described above.

(Operation When Image Data with Hidden Picture is Formed)

The owner turns on the power of information processing apparatus 24, confirms the message displayed on display unit 116, and inputs the company member number by an input operation through operation unit 114. Control unit 100 determines whether or not the input company member number is included in the company member number information stored in HDD 112, for user authentication.

If it is determined by the user authentication that the owner is a member of the company and use of information processing apparatus 24 is permitted, the owner forms original image data by an input operation through operation unit 114, and clicks the save button for saving the image data with hidden picture displayed on display unit 116.

If the save button for saving the image data with hidden picture is clicked, the setting image is displayed on display unit 116 (step S401).

The owner confirms the setting image, and inputs the owner name, saving destination of the image data with hidden picture, file name, first hidden picture and its color, second hidden picture and its color, and the password by input operations through operation unit 114. In the present modification, the owner selects and inputs a character string of "Internal User Only" to be output in small letters on an upper right corner of the printed image as the first hidden picture, and selects and inputs red as its color. The owner further selects and inputs a character string of "Confidential" to be output in large letters diagonally at the center of the printed image as the second hidden picture, and selects and inputs red as its color.

After inputting various pieces of setting information as described above, the owner presses the OK button. When the OK button is pressed (YES at S402), the print data including the formed original image data and the first and second pieces of hidden picture information based on the information input by the owner, and the authentication information including the password and the company member number of the owner, are transmitted to image processing apparatus 58 of image forming apparatus 22 through network 20 (step S403).

—Second Modification—

In the image processing system 10 described above, by the process for generating image data with hidden picture executed by control unit 50 of image forming apparatus 22, generation of print data and transmission of print data and authentication information are performed, and by the process for generating image data with hidden picture executed by unit 202 for generating image data with hidden picture, generation and storage of image data with hidden picture are performed. The present invention, however, is not limited to such an embodiment. The second modification of image processing system 10 is different from image processing system 10 described above in that the processes described above are performed by control unit 100 of information processing apparatus 324. The second modification of image processing system 10 has the same configuration as the image processing system 10 of the above-described embodiment, except for the points below.

<Hardware Configuration>

[Information Processing Apparatus 324]

HDD 112 stores a hidden picture database in addition to various data including the image data and company member number information. Further, a printer driver stored in HDD 112 is capable of realizing, when executed by control unit 100, the process for generating image data with hidden picture in accordance with the present modification as will be described later in addition to the process for converting application data to image data for printing, the process for transmitting image data designated by a user to image forming apparatus 322 to have the data printed, user authentication, and the like.

In the present modification, the owner who formed original image data by an input operation through operation unit 114 may have a save button for saving the image data with hidden picture displayed on display unit 116, by an input operation from operation unit 114. By clicking the save button for saving the image data with hidden picture using the mouse of operation unit 114, the owner can instruct to start the process for generating image data with hidden picture in accordance with the present modification.

When the save button for saving the image data with hidden picture mentioned above is clicked by the owner, the setting image is displayed on display unit 116. The setting image is the same as the setting image of the embodiment above, except that it includes an OK button. In the following, the data including the original image data and the first and second pieces of hidden picture information will be referred to as the print data.

Figure 10:
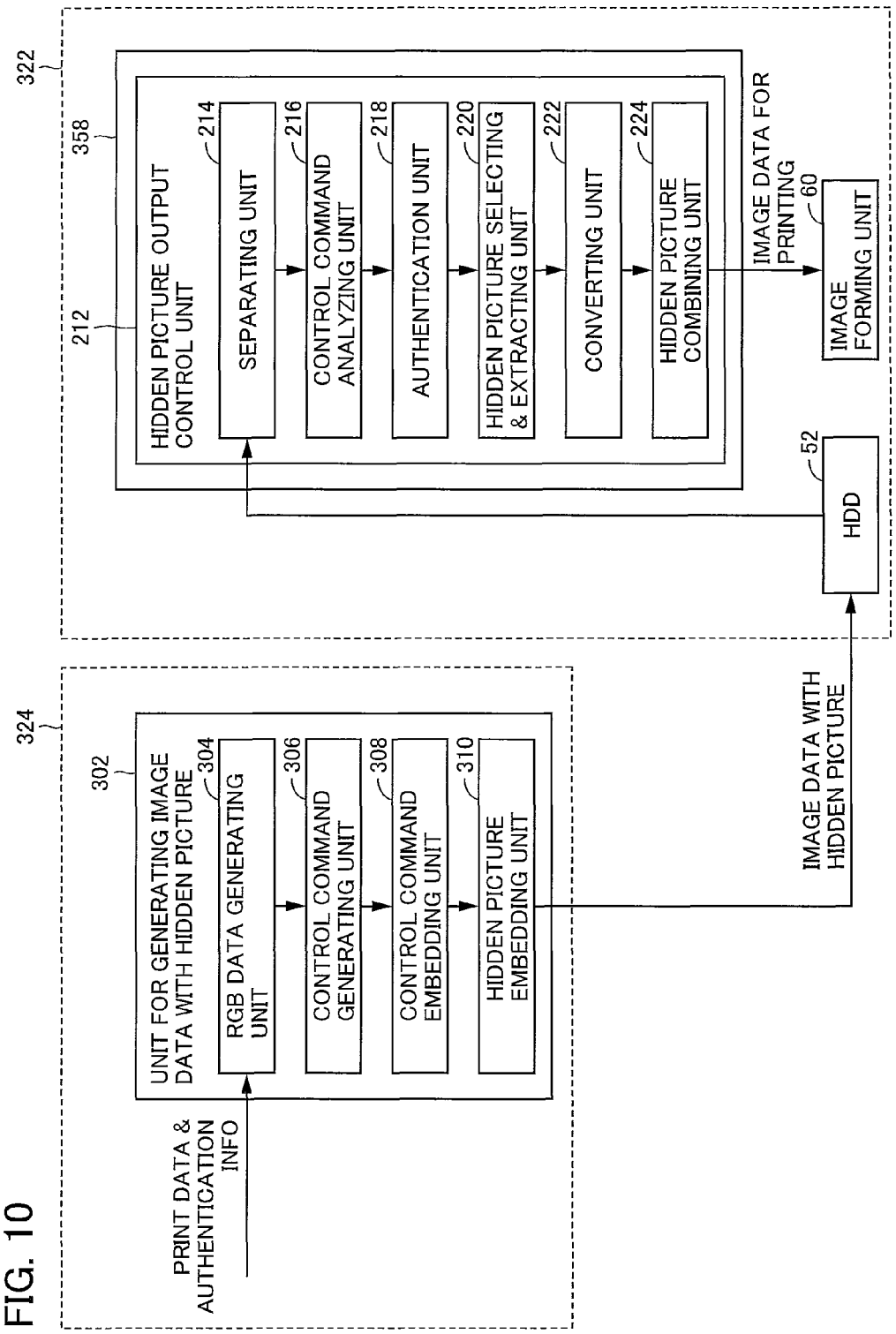
FIG. 10 is a functional block diagram of the image processing apparatus and the information processing apparatus in accordance with a second modification of an embodiment of the present invention.

Referring to FIG. 10, an image processing apparatus 358 of image forming apparatus 322 has the same functions as image processing apparatus 58 of the embodiment described above, except that it does not include the unit 202 for generating image data with hidden picture.

Information processing apparatus 324 includes a unit 302 for generating image data with hidden picture. Unit 302 for generating image data with hidden picture includes: an RGB data generating unit 304, a control command generating unit 306; a control command embedding unit 308; and a hidden picture embedding unit 310. These components of unit 302 for generating image data with hidden picture are actually realized by a computer program executed by control unit 100, and have the same functions as the components of unit 202 for generating image data with hidden picture of the above-described embodiment.

<Software Configuration>

(Process for Generating Image Data with Hidden Picture by Control Unit 100)

As described above, part of the printer driver stored in HDD 112 is programmed to execute the process for generating the image data with hidden picture in accordance with the present modification. The program for realizing the process for generating image data with hidden picture is activated when the original image data is formed by the owner and the save button for saving the image data with hidden picture is clicked.

Referring to FIG. 11, the program includes: a step S501 of causing display unit 116 to display the setting image; a step S502 of waiting until the OK button is clicked; a step S503, executed if it is determined at step S502 that the OK button is clicked (YES), of causing RGB data generating unit 304 to perform various image processing operations including the analog/digital converting process on the original image data included in the print data, to generate RGB data; and a step S504 of causing control command generating unit 306 to generate the control command based on the first and second pieces of hidden picture information included in the print data and the authentication information.

The program further includes: a step S505 of separating the RGB data into a plurality of bit planes of each color component; a step S506 of causing control command embedding unit 308 to replace the data of the 0-th bit plane of any of R data, G data and B data with the control command, and thereby embedding the control command in the RGB data; a step S507 of causing hidden picture embedding unit 310 to replace the data of the 0-th bit plane of either of the remaining R data, G data and B data with the first piece of hidden picture information, and thereby embedding the first piece of hidden picture information in the RGB data; and a step S508 of causing hidden picture embedding unit 310 to replace the data of the 0-th bit plane of the remaining one of the R data, G data and B data with the second piece of hidden picture information, and thereby embedding the second piece of hidden picture information in the RGB data.

The program further includes a step S509 of transmitting the RGB data with the control command and the first and second pieces of hidden picture information embedded therein as the image data with hidden picture, to image forming apparatus 322 through network 20. Image forming apparatus 322 stores the received image data with hidden picture in HDD 52.

<Operation>

The second modification of image processing system 10 operates in the following manner. The operations of the second modification of image processing system 10 except for the operation described below are the same as those of image processing system 10 described above.

(Operation when Image Data with Hidden Picture is Formed)

The owner turns on the power of information processing apparatus 324, confirms the message displayed on display unit 116, and inputs the company member number by an input operation through operation unit 114. Control unit 100 determines whether or not the input company member number is included in the company member number information stored in HDD 112, for user authentication.

If it is determined by the user authentication that the owner is a member of the company and use of information processing apparatus 324 is permitted, the owner forms original image data by an input operation through operation unit 114, and clicks the save button for saving the image data with hidden picture displayed on display unit 116.

If the save button for saving the image data with hidden picture is clicked, the setting image is displayed on display unit 116 (step S501).

The owner confirms the setting image, and inputs the owner name, saving destination of the image data with hidden picture, file name, first hidden picture and its color, second hidden picture and its color, and the password by input operations through operation unit 114. In the present modification, the owner selects and inputs a character string of "Internal User Only" to be output in small letters on an upper right corner of the printed image as the first hidden picture, and selects and inputs red as its color. The owner further selects and inputs a character string of "Confidential" to be output in large letters diagonally at the center of the printed image as the second hidden picture, and selects and inputs red as its color.

After inputting various pieces of setting information as described above, the owner presses the OK button. When the OK button is pressed (YES at S502), RGB data generating unit 304 performs various image processing operations including analog/digital converting process on original image data included in the print data, to generate RGB data (step S503). Control command generating unit 306 generates the control command based on the first and second pieces of hidden picture information included in the print data and on the authentication information (step S504).

Thereafter, unit 302 for generating image data with hidden picture separates the RGB data into a plurality of bit planes of each color component (step S505). After separation, control command embedding unit 308 replaces the data of the 0-th bit plane (in the present example, bit plane 501H) of any of the R data 500, G data 502 and B data 504 (see FIG. 4) (in the present example, R data 500) with the control command, and thereby embeds the control command in the RGB data (step S506).

Hidden picture embedding unit 310 replaces data of the 0-th bit plane (in the present example, bit plane 503H) of either of the remaining G data 502 and B data 504 (in the present example, G data 502) with the first piece of hidden picture information, and thereby embeds the first piece of hidden picture information in the RGB data (step S507). Hidden picture embedding unit 310 further replaces data of the 0-th bit plane (in the present example, bit plane 505H) of the remaining B data 504 with the second piece of hidden picture information, and thereby embeds the second piece of hidden picture information in the RGB data (step S508).

Unit 302 for generating image data with hidden picture transmits the RGB data with the control command and the first and second pieces of hidden picture information embedded therein as the image data with hidden picture, to image forming apparatus 322 through network 20 (step S509). Image forming apparatus 322 stores the received image data with hidden picture in HDD 52.

In the first and second modifications described above, if the original image data is not the image data formed of RGB analog signals, RGB data generating unit 204 or 304 performs various image processing operations as needed on the original image data included in the print data, to generate the RGB data.

<Functions and Effects>

According to the image processing system 10 in accordance with the embodiment described above and the first modification thereof, image processing apparatus 58 includes: unit 202 for generating image data with hidden picture, embedding, in a least significant bit plane of original image data including a plurality of bit planes, at least one piece of hidden picture information, and a control command including specifying information for specifying a print user who wants to print the original image data and user-by-user hidden picture information representing user-specific hidden picture to be printed, for generating image data with hidden picture; and a hidden picture output control unit 212, selecting the hidden picture information in accordance with the print user based on the specifying information and the user-by-user hidden picture information, and combing the hidden picture data based on the selected hidden picture information with the original image data for outputting.

As described above, based on the specifying information and the user-by-user hidden picture information embedded in the image data with hidden picture, user-specific hidden picture information is selected, and the hidden picture data based on the selected hidden picture information is combined with the original image data to be output. Therefore, output of the hidden picture information in accordance with the print user can be controlled without increasing data file size. Further, since the information is embedded in the least significant bit plane, influence on the original image data can be minimized.

Further, according to the embodiment and the modifications described above, the original image data is RGB data consisting of RGB color components, and the units 202 and 302 for generating image data with hidden picture include: a separating function of separating the RGB data into a plurality of bit planes of each color component; control command embedding units 208 and 308, for embedding a control command to the least significant bit plane of any of the R, G and B data; and hidden picture embedding units 210 and 310 for embedding a hidden picture to the least significant bit plane of any of the R, G and B data not having the control command embedded therein.

As described above, the original image data is RGB data having three least significant bit planes and, therefore, it is possible to embed the control command and the hidden picture in bit planes different from each other. Therefore, the process for selecting and extracting the embedded information becomes easier, and user convenience is improved.

Further, according to the embodiment and the modifications described above, hidden picture embedding units 210 and 310 embed the first piece of hidden picture information to the least significant bit plane of any of the R, G and B data not having the control command embedded therein, and embed the second piece of hidden picture information to the least significant bit plane of any of the R, G and B data having neither the control command nor the first piece of hidden picture information embedded therein.

Since the control command and the first and second pieces of hidden picture information are embedded in the three least significant bit planes of RGB data respectively, it is possible for hidden picture output control unit 212 to select the user-specific hidden picture information from the first and second piece of hidden picture information. Therefore, the output of hidden picture can be controlled for at least two different types of print users.

Further, according to the embodiment and the modifications described above, if the print user is the owner of original image data, hidden picture output control unit 212 does not select the hidden picture information and outputs the original image data. Therefore, the owner of the original image data can obtain the original image data not combined with the hidden picture data. Thus, user convenience can further be improved.

Further, according to the embodiment and the modifications described above, the specifying information is the company member number of the owner and the password, and hidden picture output control unit 212 includes: separating unit 214 for separating from the image data with hidden picture, the least significant bit plane to take out the control command and the first and second pieces of hidden picture information; control command analyzing unit 216 analyzing the control command and reading the company member number of the owner, the password, and the user-by-user hidden picture information; authentication unit 218, determining the print user to be the owner, a password authorized user or a guest, based on the company member number of the owner and the password; hidden picture selecting and extracting unit 220 selecting and extracting the hidden picture information in accordance with the specified print user, based on the user-by-user hidden picture information and the result of determination; and hidden picture combining unit 224 for combing the hidden picture data based on the extracted hidden picture information with the original image data for outputting.

As described above, based on the password and the company member number of the owner included in the IC card, for example, the print user is determined to be the owner, a password authorized user or a guest, and the hidden picture information is selected based on the result of determination. Thus, output control of hidden picture information in accordance with the print user can be realized in easier and more accurate manner.

Further, according to the embodiment and the modifications described above, image forming apparatus 22, 322 includes: image processing apparatuses 58, 358; and scanner unit 56 for reading image information of original document and outputting original image data based on the read image information to image processing apparatuses 58, 358.

Since the image forming apparatus 22 includes image processing apparatus 58 or 358 and scanner unit 56, it can control output of hidden picture information in accordance with the user and, in addition, it can generate original image data. Therefore, user convenience can further be improved.

The second modification of image processing system 10 includes image forming apparatus 322 including image processing apparatus 358, and information processing apparatus 324 performing data communication with image forming apparatus 322 through network 20. Information processing apparatus 324 includes: a unit 302 for generating image data with hidden picture, embedding, in a least significant bit plane of original image data including a plurality of bit planes, at least one piece of hidden picture information, and a control command including specifying information for specifying a print user who wants to print the original image data and user-by-user hidden picture information representing user-specific hidden picture to be printed, for generating image data with hidden picture; and network I/F 118 for transmitting the image data with hidden picture to image processing apparatus 358. Image processing apparatus 358 includes: network I/F 66 for receiving the image data with hidden picture; and hidden picture output control unit 212 for selecting user-specific hidden picture information based on the specifying information and the user-by user hidden picture information, and combing the hidden picture data based on the selected hidden picture information with the original image data for outputting.

In this manner, based on the specifying information and the user-by-user hidden picture information embedded in the image data with hidden picture by information processing apparatus 324, image processing apparatus 358 selects hidden picture information in accordance with the print user, combines the hidden picture data based on the selected hidden picture information with the original image data and outputs the result. Therefore, output of the hidden picture information in accordance with the print user can be controlled without increasing data file size. Further, since the information is embedded in the least significant bit plane, influence on the original image data can be minimized.

In accordance with the second modification of image processing system 10, information processing apparatus 324 includes operation unit 114 for forming the original image data. Therefore, information processing apparatus 324 can generate image data with hidden picture and generate original image data. Therefore, user convenience can further be improved.

In the embodiment and the modifications above, the image data with hidden picture is stored in HDD 52. The present invention, however, is not limited to such an embodiment. The data may be stored in HDD 112 of information processing apparatus 24, 26 or 324. In that case, at the time of printing the image with hidden picture, the print user selects image data with hidden picture stored in HDD 112 in accordance with an input operation from operation unit 114, and instructs execution of the printing process. In response to the instruction, hidden picture output control unit 212 receives the selected image data with hidden picture from information processing apparatus 24, 26 or 324, and executes various processes described above on the received image data with hidden picture.

The functions of information processing apparatuses 24 and 324 in accordance with the first and second modifications of image processing system 10 described above may be provided in information processing apparatus 26.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image processing apparatus, comprising:
an image data generation unit configured to generate image data that includes a digital watermark, by embedding, in a least significant bit plane of original image data including a plurality of bit planes, at least one piece of digital watermark information and control information including both user-specific information for authenticating a user who requests output of said original image data and user-by-user digital watermark information indicating digital watermark information to be output on a user-by-user basis, and thereby generating image data that includes a digital watermark; and
an output control unit configured to select said digital watermark information in accordance with said user based on said user-specific information and said user-by-user digital watermark information embedded in the image data, and combining a digital watermark based on the selected digital watermark information with said original image data for outputting,
wherein
said original image data is RGB data consisting of RGB color components; and
said image data generation unit includes:
a separating unit configured to separate said RGB data into a plurality of bit planes of each color component,
a control information embedding unit configured to embed said control information to the least significant bit plane of any of R data, B data and G data, and
a digital watermark embedding unit configured to embed said digital watermark information to the least significant bit plane of any of R data, B data and G data not having the control information embedded,
wherein
said at least one piece of digital watermark information includes a first piece of digital watermark information and a second piece of digital watermark information; and
said digital watermark embedding unit includes:
a first embedding unit configured to embed said first piece of digital watermark information into the least significant bit plane of any of R data, B data and G data not having the control information embedded, and
a second embedding unit configured to embed said second piece of digital watermark information into the least significant bit plane of any of R data, B data and G data having neither the control information nor the first piece of digital watermark information embedded.

2. The image processing apparatus according to claim 1, further comprising:
an authentication unit configured to authenticate a user of the original image data based on said user-specific information,
wherein said output control unit includes an output unit configured to output said original image data without selecting said digital watermark information in a case that said user is authenticated as an owner of said original image data.

3. The image processing apparatus according to claim 1, wherein
said specifying information is an authentication number for determining whether or not said user is an authorized user; and
said output control unit includes:
an information obtaining unit configured to separate a least significant bit plane from said image data that includes a digital watermark, to take out said control information and said at least one piece of digital watermark information,
a control information analyzing unit configured to analyze said control information to read said specifying information and said user-by-user digital watermark information,
a determining unit configured to determine whether or not said user is an authorized user based on said authentication number,
a selecting and extracting unit configured to select and extract said digital watermark information in accordance with said specified user, based on said user-by-user digital watermark information and the result of said determination, and
an output combining unit configured to combine a digital watermark based on said extracted digital watermark information with said original image data for outputting.

4. An image forming apparatus, comprising:
the image processing apparatus according to claim 1; and
a reading unit configured to read image information of a document, and further configured to output original image data based on the read image information to said image processing apparatus.

5. An image processing system comprising:
an image processing apparatus, and
an information processing apparatus configured to perform data communication with said image processing apparatus through a network, wherein said information processing apparatus includes:
- an image data generation unit configured to generate image data that includes a digital watermark, by embedding, in a least significant bit plane of original image data including a plurality of bit planes, at least one piece of digital watermark information and control information including both user-specific information for authenticating a user who requests output of said original image data and user-by-user digital watermark information indicating digital watermark information to be output on a user-by-user basis, and thereby generating image data that includes a digital watermark, and
- a transmitting unit configured to transmit said image data that includes a digital watermark to said image processing apparatus; and said image processing apparatus includes:
- a receiving unit configured to receive said image data that includes a digital watermark, and
- an output control unit configured to select said digital watermark information in accordance with said user based on said user-specific information and said user-by-user digital watermark information embedded in the image data, and combining a digital watermark based on the selected digital watermark information with said original image data for outputting.

6. The image processing system according to claim 5, wherein said information processing apparatus includes a data forming unit configured to form said original image data.

7. A non-transitory computer-readable recording medium having stored thereon a computer program which when executed by a computer causes the computer to function as:
- an image data generation unit configured to generate image data that includes a digital watermark, by embedding, in a least significant bit plane of original image data including a plurality of bit planes, at least one piece of digital watermark information and control information including both user-specific information for authenticating a user who requests output of said original image data and user-by-user digital watermark information indicating digital watermark information to be output on a user-by-user basis, and thereby generating image data with digital watermark, and
- an output control unit configured to select said digital watermark information in accordance with said user based on said user-specific information and said user-by-user digital watermark information embedded in the image data, and combining a digital watermark based on the selected digital watermark information with said original image data for outputting.

* * * * *